United States Patent
Li et al.

(10) Patent No.: US 9,875,250 B2
(45) Date of Patent: Jan. 23, 2018

(54) SOLID STATE DISK, DATA MANAGEMENT METHOD AND SYSTEM THEREFOR

(71) Applicant: RAMAXEL TECHNOLOGY (SHENZHEN) LIMITED, Shenzhen (CN)

(72) Inventors: Jian Li, Shenzhen (CN); Zhiqing Zhang, Shenzhen (CN); Meng Wang, Shenzhen (CN)

(73) Assignee: RAMAXEL TECHNOLOGY (SHENZHEN) LIMITED, Shenzhen (CN)

( * ) Notice: Subject to any disclaimer, the term of this patent is extended or adjusted under 35 U.S.C. 154(b) by 456 days.

(21) Appl. No.: 14/409,987

(22) PCT Filed: Jun. 18, 2013

(86) PCT No.: PCT/CN2013/077384
§ 371 (c)(1),
(2) Date: Dec. 19, 2014

(87) PCT Pub. No.: WO2013/189277
PCT Pub. Date: Dec. 27, 2013

(65) Prior Publication Data
US 2015/0363425 A1     Dec. 17, 2015

(30) Foreign Application Priority Data

Jun. 21, 2012 (CN) .......................... 2012 1 0206930

(51) Int. Cl.
*G06F 17/30* (2006.01)
*G06F 12/02* (2006.01)

(52) U.S. Cl.
CPC .... *G06F 17/30218* (2013.01); *G06F 12/0246* (2013.01); *G06F 17/30371* (2013.01);
(Continued)

(58) Field of Classification Search
CPC ................................................. G06F 12/0851
(Continued)

(56) References Cited

U.S. PATENT DOCUMENTS

2011/0066808 A1\* 3/2011 Flynn .................. G06F 12/0246
711/118
2012/0110376 A1\* 5/2012 Dreifus .................. G11C 29/76
714/6.12

FOREIGN PATENT DOCUMENTS

| CN | 102165406 A | 8/2011 |
| CN | 102239480 A | 11/2011 |
| CN | 102789368 A | 11/2012 |

\* cited by examiner

*Primary Examiner* — Baoquoc N To
(74) *Attorney, Agent, or Firm* — Maschoff Brennan (57) ABSTRACT

The present invention is applied to the technical field of solid-state storage, and provided are a solid state disk and a data management method and system. The data management method for a solid state disk comprises: saving the written data in a solid state disk after adding a timestamp to written data; receiving a mark command for marking the data to be invalid, marking an address range corresponding to the invalid data, and saving the marked information in the solid state disk after adding a timestamp to the marked information; comparing the timestamp of the marked information with the timestamp of the data in the marked address range after starting the solid state disk; if the timestamp of the data in the marked address range is earlier than the timestamp of the marked information, marking the address range as invalid, otherwise not marking the address range as invalid.

9 Claims, 5 Drawing Sheets (52) U.S. Cl.
CPC ............... *G06F 2212/1016* (2013.01); *G06F 2212/7201* (2013.01); *G06F 2212/7209* (2013.01)

(58) Field of Classification Search
USPC .................................................. 707/999.24
See application file for complete search history.

SOLID STATE DISK, DATA MANAGEMENT METHOD AND SYSTEM THEREFOR

TECHNICAL FIELD

The present invention relates to the technical field of solid-state storage, and particularly to a solid state disk and a data management method and system therefor.

BACKGROUND ART

For a traditional storage system that supports in-place updating, when a file system writes new data, the old data at the same address will be covered, so that the performance of the storage system will not be affected; however, for a solid state storage device that cannot support in-place updating, there is a need for "move-erase" garbage collection to continuously provide space which is available for writing, if the file system does not inform the storage device of the address space corresponding to the invalid data, such data is also valid for the solid state storage device and accordingly will be continuously moved ineffectively during garbage collection, thereby degrading the performance of the solid state storage device. TRIM command commands a file system to inform a storage device of the address space corresponding to the invalid data. After receipt of such a command, the storage device will mark the invalid data to disenable the data to participate in the process of garbage collection so as to prevent the storage device from unnecessarily operating over the data, thereby improving the performance of the solid state storage device.

In the existing methods for implementing TRIM, TRIM information is only saved in a way of a bitmap, and when a file system writes new data into a range indicated by TRIM, the TRIM information needs to be updated in time and, in the meanwhile, part of the TRIM information is cached in the memory in order to accelerate the updating of the TRIM information. But, more storage space will be taken up if the TRIM information is only saved in a way of a bitmap. Accordingly, when a file system writes new data into a TRIM range, the TRIM information needs to be updated in time. As a result, TRIM will be tightly coupled with a normal data stream, the efficiency of the system will be reduced, the complexity of the system will be increased, and the caching of TRIM information increases the demand of the solid state storage system for memory.

DISCLOSURE OF THE INVENTION

To overcome the above-mentioned defects, it is an object of the present invention to provide a solid state disk and a data management method and system therefor, which relieve the coupling of marked information with a normal data stream, achieve the quick marking of the invalid data in a solid state disk, improve the efficiency of the system, and reduce the demand of the system for memory and the complexity for system realization.

To this end, the present invention provides a data management method for a solid state disk, characterized by comprising:

saving the written data in a solid state disk after adding a timestamp to written data;

receiving a mark command for marking the data to be invalid, marking an address range corresponding to the invalid data, and saving the marked information in the solid state disk after adding a timestamp to the marked information; and comparing the timestamp of the marked information with the timestamp of the data in the marked address range after starting the solid state disk; if the timestamp of the data in the marked address range is earlier than the timestamp of the marked information, marking the address range as invalid, otherwise not marking the address range as invalid.

In accordance with the data management method according to the present invention, the step of "saving the written data in a solid state disk after adding a timestamp to written data" specifically comprises: receiving a data write command; resolve the write command into data write units; adding a timestamp to the data in each said data write unit; and saving the data in the data write units into the flash memory of the solid state disk.

In accordance with the data management method according to the present invention, the step of "saving the marked information in the solid state disk after adding a timestamp to the marked information" specifically comprises: resolve the marked information into a plurality of data write units; adding timestamps to the plurality of data write units; and saving the data in the data write units into the flash memory of the solid state disk.

In accordance with the data management method according to the present invention, characterized by further comprising the following steps before the step of "comparing the timestamp of the marked information with the timestamp of the data in the marked address range": scanning the solid state disk to create a logical physical address mapping table; reading the marked information from the flash memory of the solid state disk; and scanning the marked address range according to the marked information.

In accordance with the data management method according to the present invention, the marked information is saved in a way of a bitmap.

Accordingly, the present invention provides a data management system for a solid state disk, characterized by comprising:

a write data processing module adapted for saving the written data in a solid state disk after adding a timestamp to written data;

a marking module adapted for receiving a mark command for marking the data to be invalid, marking an address range corresponding to the invalid data, and saving the marked information in the solid state disk after adding a timestamp to the marked information; and an initialization module adapted for comparing the timestamp of the marked information with the timestamp of the data in the marked address range after starting the solid state disk, marking the address range as invalid if the timestamp of the data in the marked address range is earlier than the timestamp of the marked information, otherwise not marking the address range as invalid.

In accordance with the data management system according to the present invention, the write data processing module adapted for saving the written data in a solid state disk after adding a timestamp to written data specifically comprises: receiving a data write command; resolve the write command into data write units; adding a timestamp to the data in each said data write unit; and saving the data in the data write units into the flash memory of the solid state disk.

In accordance with the data management system according to the present invention, the marking module adapted for saving the marked information in the solid state disk after adding a timestamp to the marked information specifically comprises: resolve the marked information into a plurality of data write units; adding timestamps to the plurality of data write units; and saving the data in the data write units into the flash memory of the solid state disk.

In accordance with the data management system according to the present invention, the initialization module is further adapted for scanning the solid state disk to create a logical physical address mapping table; reading the marked information from the flash memory of the solid state disk; and scanning the marked address range according to the marked information.

The present invention further provides a solid state disk comprising said data management system for a solid state disk.

According to the present invention, when data or invalid marked information is written into the storage device of a solid state disk, the written timestamp is recorded, and when the solid state disk is started, the timestamp of the data is compared with the timestamp of the invalid marked information to determine whether to apply the invalid marked information, and the specific address range is marked as invalid. When new data is written into the address range marked as invalid, since the timestamp of the newly written data is later than the timestamp of the marked information in the address range, the marked information will not be applied, i.e. the address range will not be marked as invalid, when the solid state disk is started. Thus, when a file system writes new data into the address range marked as invalid, the file system does not need to update the marked information, but adds timestamps to the data and the marked information to apply the invalid marks in the address range, relieve the coupling of marked information with a normal data stream, achieve the quick marking of the invalid data in a solid state disk, and improve the efficiency of the system; meanwhile, both the marked information and the data are saved in the same way in the flash memory of the solid state disk, and they need not be saved in the memory, thereby reducing the demand of the system for memory and the complexity for system realization.

EMBODIMENTS

To make the object, technical solutions and advantages of the present invention more clear, the present invention is further described in detail hereinafter with reference to the accompanying drawings and embodiments. It should be appreciated that the specific embodiments described herein are only intended to illustrate the present invention but not to limit it.

Figure 1:
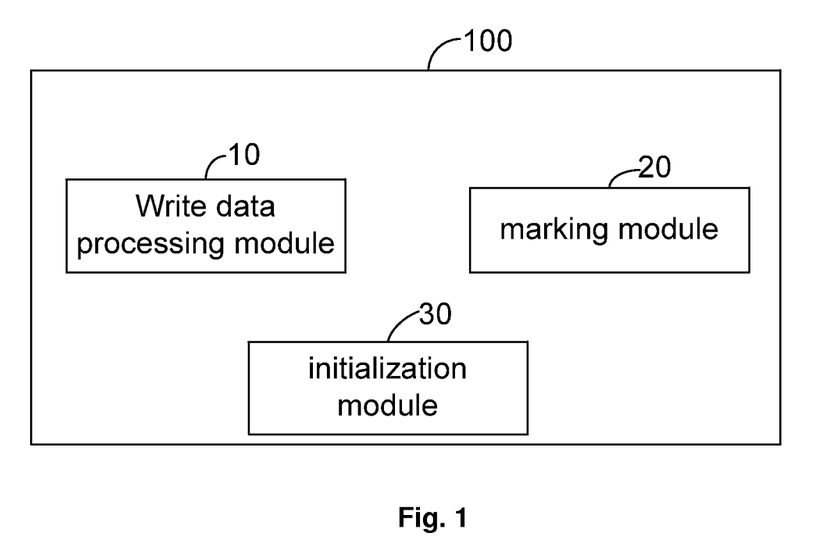
FIG. 1 is a principle diagram of the data management system for a solid state disk according to the present invention.

As shown in FIG. 1, a data management system 100 for a solid state disk according to the present invention for use in a solid state disk mainly comprises a write data processing module 10, a marking module 20, and an initialization module 30.

The write data processing module 10 is adapted for saving the written data in a solid state disk after adding a timestamp to written data. Specifically, when a file system writes new data into the solid state disk, the solid state disk receives a data write command, divides the data write command into a plurality of data write units (the data write unit may be a page or a sector, etc.), adds a timestamp to the data in each said data write unit, and saves the data in the data write units into the flash memory of the solid state disk.

The marking module 20 is adapted for receiving a mark command for marking the data to be invalid, marking an address range corresponding to the invalid data, and saving the marked information in the solid state disk after adding a timestamp to the marked information. Specifically, the solid state disk receives from the file system a command (e.g. TRIM command) for marking the data to be invalid, marks an address range corresponding to the invalid data in a logical physical address mapping table, divides the marked information into a plurality of data write units, adds timestamps to the plurality of data write units and then saves the plurality of data write units in the flash memory of the solid state disk. The marked information includes which address ranges are invalid and which address ranges are valid; the marked information can be saved in a way of a bitmap, and corresponds to the valid address ranges and the invalid address ranges, respectively, using different expressions (e.g., the colors of pixels) in the bitmap. Preferably, the command for marking the data to be invalid is generally sent when the file system deletes data. The logical physical address mapping table shows the mapping relation between logical addresses and physical addresses.

The initialization module 30 is adapted for comparing the timestamp of the marked information with the timestamp of the data in the marked address range after starting the solid state disk, marking the address range as invalid if the timestamp of the data in the marked address range is earlier than the timestamp of the marked information, otherwise not marking the address range as invalid. Specifically, after the solid state disk is started, the solid state disk is scanned to create a logical physical address mapping table; the marked information is read from the flash memory of the solid state disk; the marked address range is scanned according to the marked information, and the timestamp of the marked information is compared with the timestamp of the data in the marked address range; if the timestamp of the data in the marked address range is earlier than the timestamp of the marked information, the address range is marked as invalid in the logical physical address mapping table.

According to an embodiment of the present invention, the following two circumstances generally exist during the initialization of the solid state disk:

1. If data is written into a certain address range and then the address range is marked as invalid, then the timestamp of the data in the address range definitely will be earlier than the timestamp of the marked information. Then, during the next initialization, the timestamp of the data in the address range may be compared with the timestamp of the marked information to determine that the address range is indeed invalid, thereby applying the marked information in the logical physical address mapping table and marking the address range as invalid once again.

2. If new data is written after a certain address range is marked as invalid, then the timestamp of the data in the address range definitely will be later than the timestamp of the marked information. Then, during the next initialization, the timestamp of the data in the address range may be compared with the timestamp of the marked information to determine that the address range is valid, thereby not applying the marked information in the logical physical address mapping table and not marking the address range as invalid once again. Thus, when a file system writes new data into the address range which has been marked as invalid, it does not need to update the marked information, relieves the coupling of marked information with a normal data stream, achieves the quick marking of the invalid data of a solid state disk, improves the efficiency of the system, and reduces the demand of the system for memory.

According to the present invention, when data or invalid marked information is written into the storage device of a solid state disk, the written timestamp is recorded, and when the solid state disk is started, the timestamp of the data is compared with the timestamp of the invalid marked information to determine whether to apply the invalid marked information, and the specific address range is marked as invalid. When new data is written into the address range which is marked as invalid, since the timestamp of the newly written data is later than the timestamp of the marked information in the address range, the marked information will not be applied, i.e. the address range will not be marked as invalid, when the solid state disk is started. Thus, when a file system writes new data into the address range marked as invalid, the file system does not need to update the marked information, but adds timestamps to the data and the marked information to apply the invalid marks in the address range, relieves the coupling of marked information with a normal data stream, achieves the quick marking of the invalid data of a solid state disk, and improves the efficiency of the system; meanwhile, both the marked information and the data are saved in the same way in the flash memory of the solid state disk, and they need not be saved in the memory, thereby reducing the demand of the system for memory and the complexity for system realization.

Figure 2:
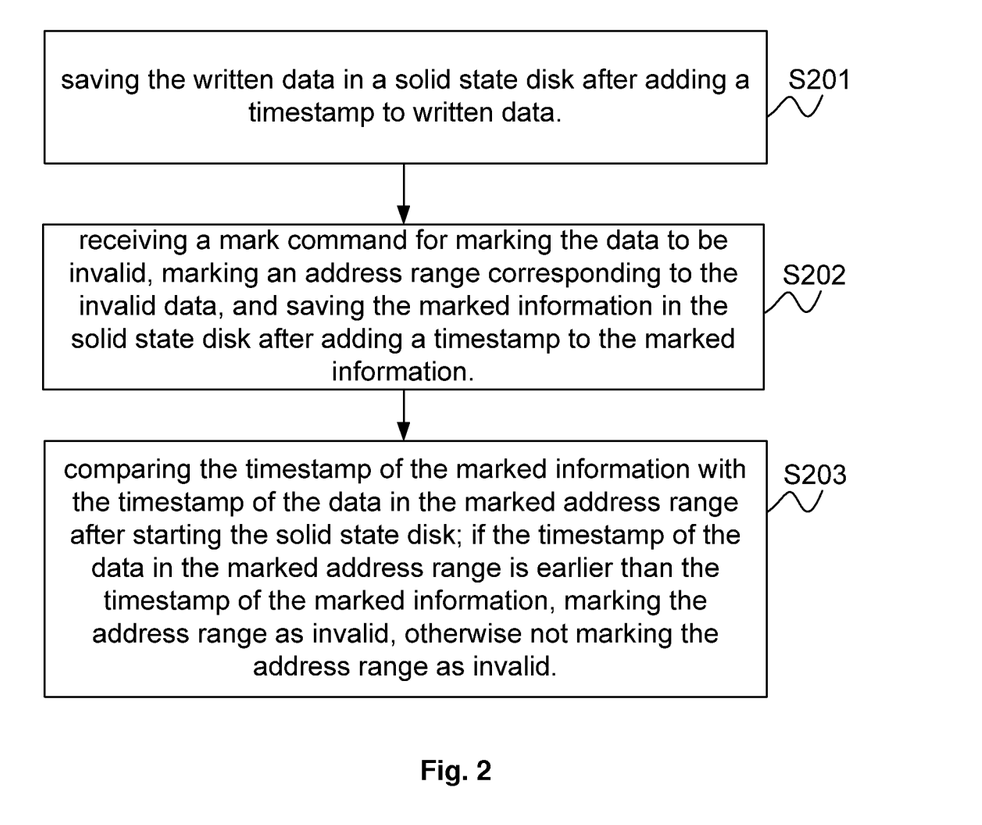
FIG. 2 is a flow chart of data management method for a solid state disk according to the present invention.

Accordingly, the present invention provides a data management method for a solid state disk, which is carried out by means of the management system as shown in FIG. 1, the method mainly comprises the following work flow:

Step S201: saving the written data in a solid state disk after adding a timestamp to written data. This step is performed by the write data processing module 10.

Step S202: receiving a mark command for marking the data to be invalid, marking an address range corresponding to the invalid data, and saving the marked information in the solid state disk after adding a timestamp to the marked information. This step is performed by the marking module 20.

Step S203: comparing the timestamp of the marked information with the timestamp of the data in the marked address range after starting the solid state disk; if the timestamp of the data in the marked address range is earlier than the timestamp of the marked information, marking the address range as invalid, otherwise not marking the address range as invalid. This step is performed by the initialization module 30.

Preferably, the above step S201 specifically comprises: receiving a data write command; resolve the write command into data write units; adding a timestamp to the data in each said data write unit; and saving the data in the data write units into the flash memory of the solid state disk.

Preferably, in the above step S202, saving the marked information in the solid state disk after adding a timestamp to the marked information specifically comprises: resolve the marked information into a plurality of data write units; adding timestamps to the plurality of data write units; and saving the data in the data write units into the flash memory of the solid state disk.

Preferably, the above step S203 specifically comprises: scanning the solid state disk to create a logical physical address mapping table; reading the marked information from the flash memory of the solid state disk; scanning the marked address range according to the marked information; comparing the timestamp of the marked information with the timestamp of the data in the marked address range; if the timestamp of the data in the marked address range is earlier than the timestamp of the marked information, marking the address range as invalid in the logical physical address mapping table, otherwise not marking the address range as invalid.

Figure 3:
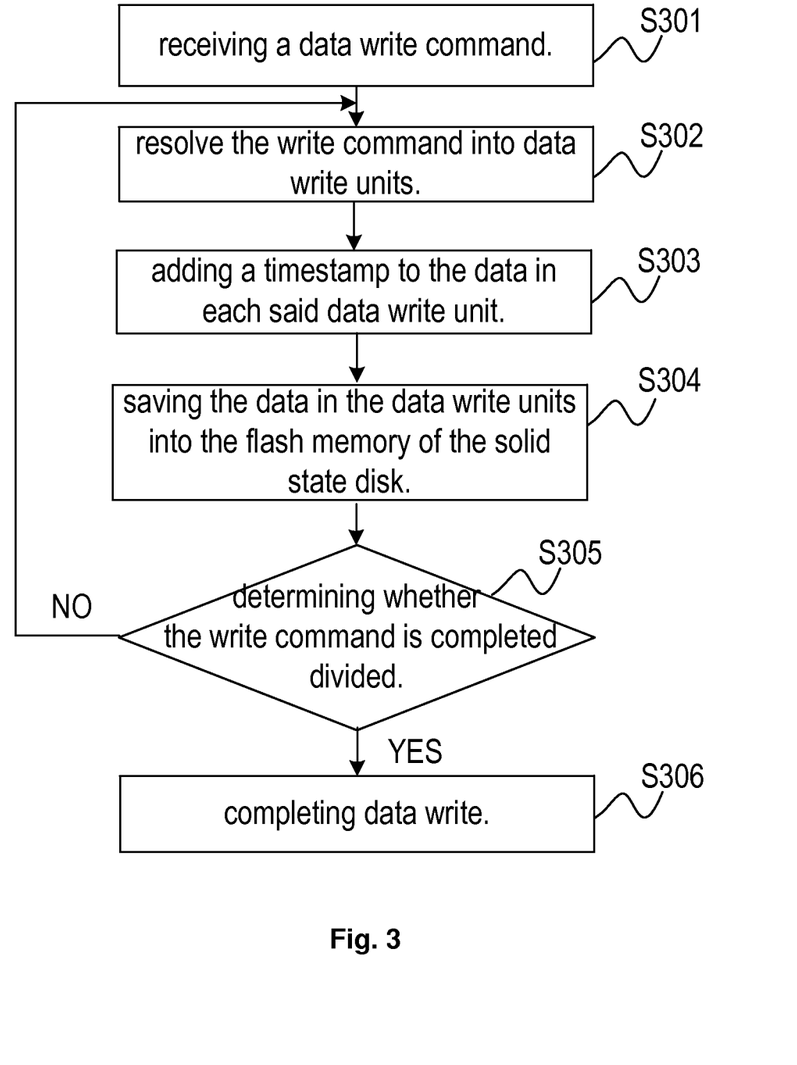
FIG. 3 is a work flow chart of an embodiment of a write data processing module of the data management system for a solid state disk according to the present invention.

FIG. 3 is a work flow chart of an embodiment of a write data processing module of the data management system for a solid state disk according to the present invention. The work flow comprises the steps of:

Step S301: receiving a data write command.

Step S302: resolve the write command into data write units.

Step S303: adding a timestamp to the data in each said data write unit.

Step S304: saving the data in the data write units into the flash memory of the solid state disk.

Step S305: determining whether the write command is completed divided, and performing step S306 if YES, otherwise returning to step S302.

Step S306: completing data write.

In the above work flow, once the write data processing module 10 divides a data write unit, the write data processing module 10 adds a timestamp to the data write unit immediately and at the same time divides the next data write unit, i.e. the step of adding a timestamp and the step of resolve the next data write unit are performed concurrently.

Figure 4:
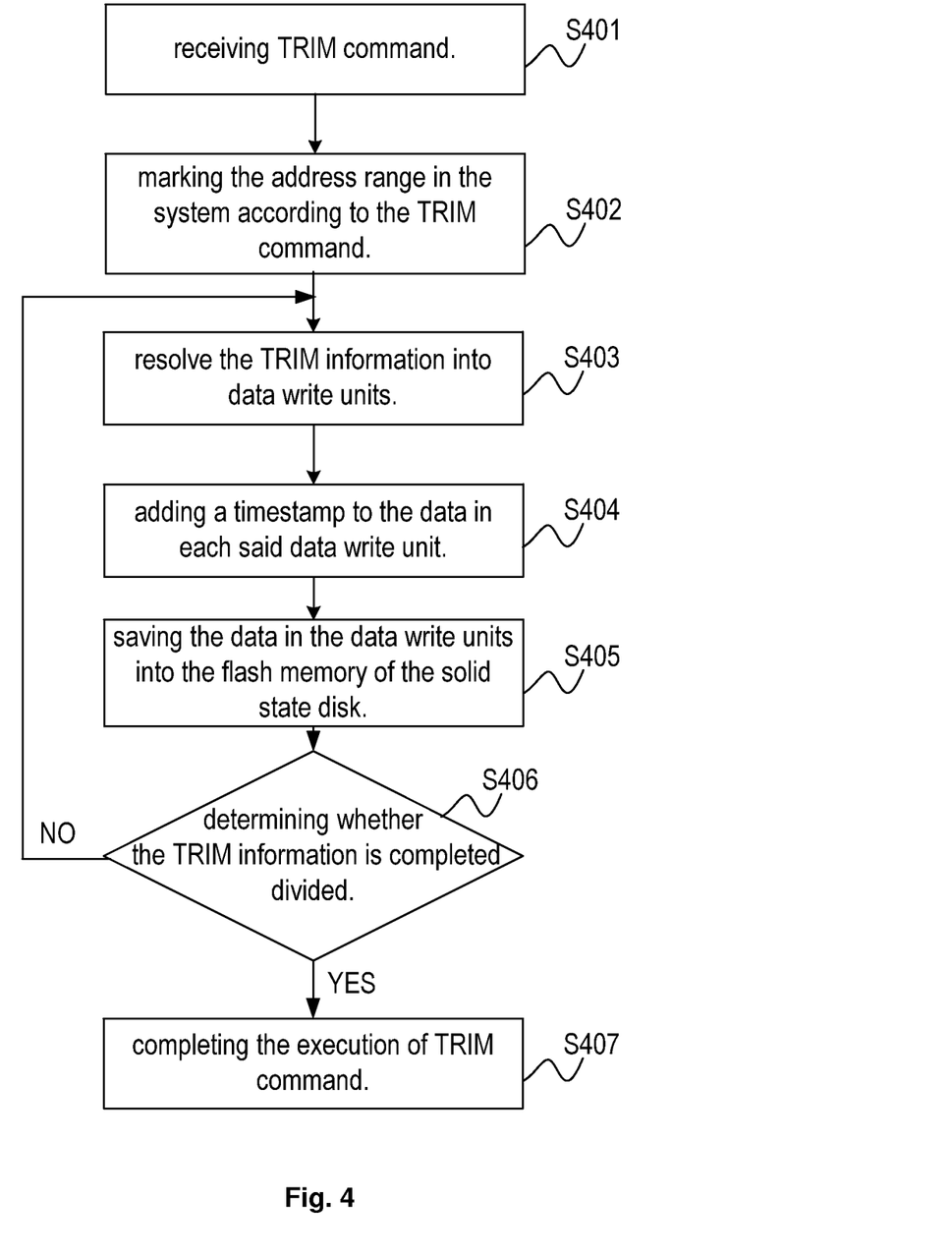
FIG. 4 is a work flow chart of an embodiment of a marking module of the data management system for a solid state disk according to the present invention.

FIG. 4 is a work flow chart of an embodiment of a marking module of the data management system for a solid state disk according to the present invention. The work flow comprises the steps of:

Step S401: receiving TRIM command. TRIM command commands a file system to inform a storage device of the address space corresponding to the invalid data.

Step S402: marking the address range in the system according to the TRIM command. The corresponding address space is marked as invalid according to the TRIM command.

Step S403: resolve the TRIM information into data write units. The TRIM information includes which address ranges are invalid and which address ranges are valid, and the TRIM information can be saved in a way of a bitmap.

Step S404: adding a timestamp to the data in each said data write unit.

Step S405: saving the data in the data write units into the flash memory of the solid state disk.

Step S406: determining whether the TRIM information is completed divided, and performing step S407 if YES, otherwise returning to step S403.

Step S407: completing the execution of TRIM command.

Figure 5:
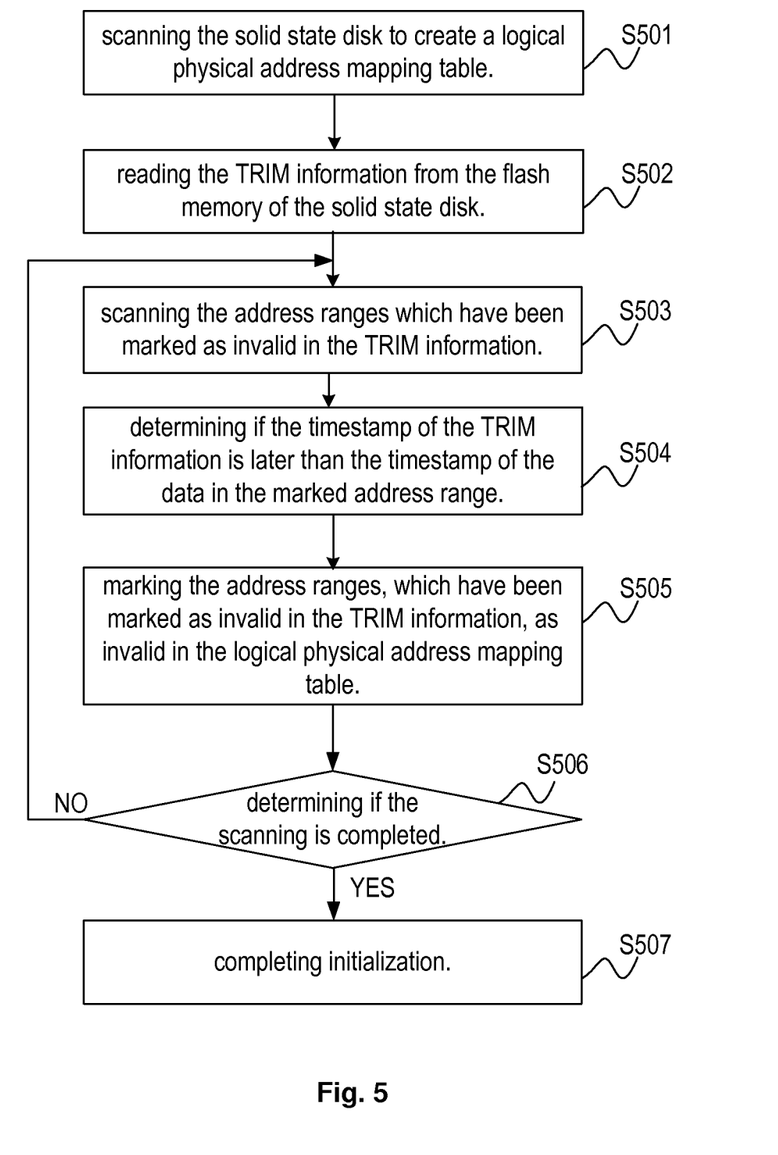
FIG. 5 is a work flow chart of an embodiment of the initialization of the solid state disk according to the present invention.

FIG. 5 is a work flow chart of an embodiment of the initialization of the solid state disk according to the present invention, comprising the steps of:

Step S501: scanning the solid state disk to create a logical physical address mapping table.

Step S502: reading the TRIM information from the flash memory of the solid state disk. The TRIM information is saved in a way of a bitmap, and corresponds to the valid address ranges and the invalid address ranges, respectively, using different expressions (e.g., the colors of pixels) in the bitmap.

Step S503: scanning the address ranges which have been marked as invalid in the TRIM information.

Step S504: determining if the timestamp of the TRIM information is later than the timestamp of the data in the marked address range. If YES, the step S505 will be performed, otherwise the step S506 will be performed.

Step S505: marking the address ranges, which have been marked as invalid in the TRIM information, as invalid in the logical physical address mapping table.

Step S506: determining if the scanning is completed, and performing step S507 if YES, otherwise returning to step S503.

Step S507: completing initialization.

In the above work flow, the TRIM information includes the address ranges which are marked as invalid, but after the solid state disk is started, such marked information cannot be found in the newly created logical physical address mapping table, so during initialization, it is necessary to apply the address ranges, which have been marked as invalid in the TRIM information, to the logical physical address mapping table. Furthermore, when the TRIM information is saved by a mixed method involving ranges and bitmaps, the amount of TRIM information needed to be saved is reduced, the execution of TRIM command and the application of TRIM information are accelerated, and the system boot time is reduced.

To sum up, according to the present invention, when data or invalid marked information is written into the storage device of a solid state disk, the written timestamp is recorded, and when the solid state disk is started, the timestamp of the data is compared with the timestamp of the invalid marked information to determine whether to apply the invalid marked information, and the specific address range is marked as invalid. When new data is written into the address range marked as invalid, since the timestamp of the newly written data is later than the timestamp of the marked information in the address range, the marked information will not be applied, i.e. the address range will not be marked as invalid, when the solid state disk is started. Thus, when a file system writes new data into the address range which is marked as invalid, the file system does not need to update the marked information, but adds timestamps to the data and the marked information to apply the invalid marks in the address range, relieve the coupling of marked information with a normal data stream, achieve the quick marking of the invalid data in a solid state disk, and improve the efficiency of the system; meanwhile, both the marked information and the data are saved in the same way in the flash memory of the solid state disk, and they need not be saved in the memory, thereby reducing the demand of the system for memory and the complexity for system realization.

Of course, the present invention may have a variety of other embodiments. Those skilled in the art can make all kinds of corresponding changes and modifications according to the present invention without departing from the spirit and essence of the present invention. It is intended that all these changes and modifications be covered by the appended claims of the present invention.

The invention claimed is:

1. A data management method for a solid state disk, comprising:

saving new written data in a solid state disk along with a first timestamp corresponding to the new written data;

receiving a mark command including marked information having an invalid address range corresponding to invalid data and a valid address range corresponding to valid data;

marking the invalid address range corresponding to the invalid data; and saving the marked information in the solid state disk along with a second timestamp corresponding to the marked information; and determining whether to apply the marked information having the invalid address range by comparing the second timestamp of the marked information with the first timestamp of the new written data, wherein the new written data is in the address range corresponding to the invalid data, and if the first timestamp of the new written data is earlier than the second timestamp of the marked information, marking an address range of the new written data as invalid, otherwise not marking the address range of the new written data as invalid such that the marked information is not applied for the address range of the new written data.

2. The data management method according to claim 1, the step of saving the new written data in the solid state disk after adding the first timestamp to the new written data comprising:

receiving a data write command;

resolving the data write command into data write units;

adding a timestamp to the data in each said of the data write units; and saving the data in the data write units into a flash memory of the solid state disk.

3. The data management method according to claim 1, the step of saving the marked information in the solid state disk after adding the second timestamp to the marked information comprising:

resolving the marked information into a plurality of data write units;

adding timestamps to the plurality of data write units; and saving the data in the data write units into a flash memory of the solid state disk.

4. The data management method according to claim 1, wherein before the step of comparing the second timestamp of the marked information with the first timestamp of the new written data, the method comprises:

scanning the solid state disk to create a logical physical address mapping table;

reading the marked information from a flash memory of the solid state disk; and scanning the marked address range according to the marked information.

5. The data management method according to claim 1, wherein the marked information is saved as a bitmap.

6. A solid state disk comprising a data management system for the solid state disk, the data management system comprising:

a write data processing module adapted for saving new written data in the solid state disk along with a first timestamp corresponding to the new written data;

a marking module adapted for:

receiving a mark command including marked information having an invalid address range corresponding to invalid data and a valid address range corresponding to valid data;

marking the invalid address range corresponding to the invalid data; and saving the marked information in the solid state disk along with a second timestamp corresponding to the marked information; and an initialization module adapted for:

determining whether to apply the marked information having the invalid address range by comparing the second timestamp of the marked information with the first timestamp of the new written data, wherein the new written data is in the address range corresponding to the invalid data, and marking an address range of the new written data as invalid if the first timestamp of the new written data is earlier than the second timestamp of the marked information, and otherwise not marking the address range of the new written data as invalid such that the marked information is not applied for the address range of the new written data.

7. The data management system according to claim 6, the write data processing module is further adapted for:

receiving a data write command;

resolving the data write command into data write units;

adding a timestamp to the data in each of the data write units; and saving the data in the data write units into a flash memory of the solid state disk.

8. The data management system according to claim 6, the marking module is further adapted for:

resolving the marked information into a plurality of data write units;

adding timestamps to the plurality of data write units; and saving the data in the data write units into a flash memory of the solid state disk.

9. The data management system according to claim 6, the initialization module further adapted for:

scanning the solid state disk to create a logical physical address mapping table;

reading the marked information from a flash memory of the solid state disk; and scanning the marked address range according to the marked information.

\* \* \* \* \*